United States Patent
Maurice et al.

(10) Patent No.: US 8,377,532 B2
(45) Date of Patent: Feb. 19, 2013

(54) LAMINATED MATERIAL SUITABLE FOR FORMING CONTAINERS

(75) Inventors: Thierry Maurice, Chalon en Champagne (FR); John Suter, Bethlehem, PA (US); Robert Miskevich, Bangor, PA (US)

(73) Assignee: Albea Services, Gennevilliers (FR)

( * ) Notice: Subject to any disclaimer, the term of this patent is extended or adjusted under 35 U.S.C. 154(b) by 26 days.

(21) Appl. No.: 13/028,904

(22) Filed: Feb. 16, 2011

(65) Prior Publication Data

US 2012/0205267 A1    Aug. 16, 2012

(51) Int. Cl.
     *B29D 22/00*      (2006.01)
(52) U.S. Cl. ...................................... 428/35.8; 428/35.9
(58) Field of Classification Search .................. 428/35.7, 428/35.8, 35.9, 36.91
See application file for complete search history.

(56) References Cited

U.S. PATENT DOCUMENTS

| | | | |
|---|---|---|---|
| 2004/0197507 A1* | 10/2004 | Colombo | 428/35.7 |
| 2006/0091157 A1* | 5/2006 | Nomula | 222/326 |
| 2006/0257648 A1 | 11/2006 | Nageli et al. | |
| 2009/0061061 A1* | 3/2009 | Beckwith et al. | 426/546 |
| 2010/0100320 A1* | 4/2010 | Yu et al. | 701/213 |
| 2010/0201082 A1* | 8/2010 | Hart | 277/654 |

FOREIGN PATENT DOCUMENTS

| | | |
|---|---|---|
| DE | 10260695 A1 | 5/2004 |
| EP | 0321172 A2 | 6/1989 |
| GB | 2468309 | 9/2010 |
| WO | 0007817 | 2/2000 |

OTHER PUBLICATIONS

XP-002649725, Database WPI Week 200372, Thomson Scientific, London, GB, AN 2003-759130 and JP 2003 054589 , Yoshino Kogyosho KK, whole document, dated Feb. 26, 2003, Drawing not submitted.
XP-002649918, Database WPI Week 200967, Thomson Scientific, London, GB, AN 2009-P41181 and JP 2009 227280 A (Metal Color KK), Abstract, dated Oct. 8, 2009.
XP-002649919, Database WPI Week 200607, Thomson Scientific, London, GB, AN 2006-061244, and JP 2006 001609 A (Fujimori Ind Co. Ltd), Abstract, dated Jan. 5, 2006.
XP-002649920, Database WPI Week 201044, Thomson Scientific, London, GB, AN 2010-H08999 and JP 2010 137886A (Dainippon Printing Co. Ltd.), Abstract, dated Jun. 24, 2010.
XP-002649921, Database WPI Week 201070, Thomson Scientific, London, GB, AN 2010-N28541 and JP 2010 235160A (Dainippon Printing Co. Ltd.), Abstract, dated Oct. 21, 2010.
EP Application 11305162, European Search Report, dated Jul. 11, 2011.

* cited by examiner

*Primary Examiner* — N. Edwards
(74) *Attorney, Agent, or Firm* — Banner & Witcoff, Ltd.

(57) ABSTRACT

The invention relates to a laminated material for forming a flexible container for holding a hair dye or the like, the laminated material having a first surface which, in use, forms the internal surface of the container, and a second surface which, in use, forms the external surface of the container, the laminated material comprising an inner layer, an outer layer and an intermediate metal foil barrier layer, wherein the inner layer is on the first surface side of the metal foil barrier layer, and wherein the outer layer is on the second surface side of the metal foil barrier layer, wherein the laminated material has a total thickness of at most 240 μm, and wherein the inner layer comprises polyethylene and has a mean density of 0.92 to 0.94 g/cm³.

19 Claims, 2 Drawing Sheets

LAMINATED MATERIAL SUITABLE FOR FORMING CONTAINERS

LAMINATE

The present invention relates to the field of aluminium barrier laminates (ABL). More specifically, the present invention relates to a laminated material suitable for forming containers able to store conventionally "hard-to-hold" chemical compositions, such as hair dye.

Aluminium barrier laminates (ABL) are well known for use in forming tubes and containers suitable for holding many products, such as toothpaste, foodstuffs, creams and various skincare and cosmetic formulations. Some products, however, can be corrosive. As a consequence, the aluminium necessary for the excellent barrier properties it provides, needs to be protected from the product. Permanent hair dye formulations are a good example and whereas they can be stored in aluminium tubes having a reinforced inner protective lacquer coating, they are not suited for the standard ABL laminate tubes. In such products, the corrosive formula can actually penetrate by diffusion through the inner polymer layers applied to protect the aluminium foil of the ABL and attack the interfacial joins. The attack on the joins can cause delamination of the laminate material, failure of the sealed regions and subsequent failure of the package.

For several reasons, including marketing pressure and cost considerations, it is desirable to be able to store hair dye in ABL laminate tubes and this is an object of the present invention.

To obtain an ABL laminate tube that can store such aggressive products it is essential to satisfy two key requirements, namely, that the product (1) does not leak out of the container prior to use by the consumer and (2) does not otherwise have contact with the atmosphere before use. Hair dye, for example, is highly air-sensitive and corrosive (often having a pH of around 12). If hair dye is left exposed to air then it oxidises to a dark black and is both unsightly to consumers and, above all, ceases to work optimally.

With just these limitations in mind, it would be possible to design a robust container for such products. However, due to the relatively low value of the contents and the disposable nature of the containers, it is essential that the containers do not require costly materials or complicated manufacture processes. Indeed, for single-use containers, there is a particular desire to minimise the use of any unnecessary packaging materials or cost.

Accordingly, there is a desire for a laminated material and containers that will overcome, or at least mitigate, some or all of the problems associated with the prior art or at least provide a useful or optimized alternative.

In a first aspect, the present invention provides a laminated material for forming a flexible container for holding a hair dye or the like, the laminated material having a first surface which, in use, forms the internal surface of the container, and a second surface which, in use, forms the external surface of the container, the laminated material comprising an inner layer, an outer layer and an intermediate metal foil barrier layer, wherein the inner layer is on the first surface side of the metal foil barrier layer, and wherein the outer layer is on the second surface side of the metal foil barrier layer, wherein the laminated material has a total thickness of at most 240 µm, and wherein the inner layer comprises polyethylene and has a mean density of 0.92 to 0.94 g/cm$^3$.

The present invention will now be described further. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

As used herein, the terms "over", "outer", "inner" and "under", and the like, used with respect to the various layers refer to the laminated material with the intended outer surface uppermost and the intended inner (product-contacting) surface lowermost. In addition, these terms and the term "on" does not imply that the layers are necessarily directly in contact. For example, the inner layer being "formed on" the metal foil barrier layer does not preclude the presence of one or more other intervening layers located between the inner layer and the metal foil barrier layer or further layers provided under the inner layer (i.e. between the inner layer and the product).

The term "container" is used herein to refer to an item which may contain a product. Such products are usually liquids, gels or pastes. Preferred containers include tubes and pouches. The container may further comprise a lid and, if necessary, attachment means for the lid (such as a shoulder) before it forms a useful commercial container. Such components are well known in the art. However, the term is used herein to refer to the body of the container that contains and contacts the commercial product. Preferably the container is for holding hair dye.

The term "flexible" as used herein describes the container which can bend or be bent easily and which does not break (unless it is bent too much). Herein in connection with the containers the term flexible indicates that if the container is subjected to a force, for example, by being filled with a liquid, or by applying pressure with a finger or a hand, it will change its form without breaking. A flexible container can also be considered to be a "squeezable" container.

The term "deadfold" is a term in the art and is used herein to refer to the ability of the laminate to retain its shape permanently once it is folded or dented and to not spring back to an unfolded or undented state. As an example, aluminium foil sheeting, once folded or shaped about an item, retains that shape and, thus, may be considered to have excellent dead fold characteristics. Conversely, typical plastic food wraps tend to quickly spring back, unfold, or unwrap after being shaped about an item. This is an example of poor dead fold characteristics. Since the laminated material comprises a foil and plastic layers, the deadfold property will lie between these extremes.

The tube of the present invention is especially suitable for holding "hard-to-hold" or "aggressive" compositions. These included hair colorants (or hair dyes), are chemically reactive and generally contain one or more acidic, basic, and/or oxidizing ingredients. These ingredients often fall within the chemical classes of inorganic hydroxides, inorganic halides, and peroxides. Inorganic hydroxides include ammonium hydroxide as well as alkali and alkaline earth metal hydroxides (e.g., potassium hydroxide and calcium hydroxide). Inorganic halides include fluorides, chlorides, bromides, and iodides of ammonium and metals such as transition metals, alkali metals, and alkaline earth metals. Aluminium chloride, potassium chloride, and ammonium fluoride are specific examples. Peroxides include hydrogen peroxide, urea peroxide (carbamide), and alkali and alkaline earth metal peroxides (e.g., sodium peroxide). Representative aggressive products have pH values of less than about 4 (e.g., in the range from about 1 to about 4, or from about 1 to about 3) or otherwise pH values of greater than about 9 (e.g., in the range from about 10 to about 13, or from about 10 to about 12), and often greater than about 11 (e.g., in the range from about 11 to about 14).

The present inventors have discovered that presently-available containers for holding hard-to-hold compositions, such as hair dye, are not suitable for the purpose. This is because the containers are overbuilt and require excess material to ensure that no leakage, de-lamination or oxygen ingress occurs. Accordingly, the inventors have sought an alternative material for forming a container that minimises the amount of component materials needed to reduce cost, while still providing an effective container.

The present inventors have discovered that it is possible to achieve this effect by using an inner layer of polyethylene having a mean density of 0.92 to 0.94 g/cm$^3$. Preferably the inner layer also has a thickness of from 30 to 90 μm.

Polyethylene compositions for forming layers are well known in the art. In general, polyethylene is a thermoplastic polymer consisting of long chains of polymerised ethylene monomers. Polyethylene is classified into several different categories based mostly on its density and branching. The mechanical properties of polyethylene depend significantly on variables such as the extent and type of branching, the crystal structure and the molecular weight. By way of examples; high density PE (HDPE) is defined by a density of greater or equal to 0.941 g/cm$^3$. HDPE has a low degree of branching and thus stronger intermolecular forces and tensile strength. Medium density PE (MDPE) is defined by a density range of 0.926-0.940 g/cm$^3$. Linear low density polyethylene (LLDPE) is defined by a density range of 0.915-0.925 g/cm$^3$. LLDPE is a substantially linear polymer with significant numbers of short branches, commonly made by copolymerization of ethylene with short-chain alpha-olefins (for example, 1-butene, 1-hexene and 1-octene). Low density polyethylene (LDPE) is defined by a density range of 0.910-0.940 g/cm$^3$. LDPE has a high degree of short and long chain branching, which means that the chains do not pack into the crystal structure as well. This results in a lower tensile strength and increased ductility. Very low density polyethylene (VLDPE) is defined by a density range of 0.880-0.915 g/cm$^3$. Synthetic methods for producing all of these compositions are well known in the art.

Preferably the laminated material has a total thickness of at most 240 μm, more preferably from 150 to 240 μm, more preferably from 200 to 240 μm and most preferably from 225 to 235 μm. The inventors have discovered that if the container walls are too thin then the container feels flimsy to the end user/consumer and will not be acceptable. Accordingly, the end users prefer the container to have thicker walls. The preferred wall thickness reduces the amount of material required while providing sufficient structure to satisfy the consumer.

Preferably the metal foil is an aluminium or aluminium alloy foil. Preferably the metal foil layer is from 5 to 30 microns, more preferably 5 to 20 microns and more preferably from 15 to 9 microns thick. This thickness provides a sufficient strength to the container product and provides a good deadfold in the present laminate of less than 240 μm total thickness. The metal foil and, in particular, aluminium foil is expensive so a minimum suitable thickness of aluminium is employed.

In an alternative embodiment, the metal foil is an aluminium foil having a thickness of from 20 to 30 microns. This increased thickness serves to improve the deadfold characteristics of the tube, albeit at an increasing material cost.

The product-contacting side of the metal barrier foil layer is provided with a layer of polyethylene having a mean density of 0.92 to 0.94 g/cm$^3$ and preferably a thickness of from 30 to 90 μm. This layer is preferably in direct contact with the product. This layer is also preferably directly adhered to the metal foil layer with a single tie layer.

The term "tie layer" is a layer which is placed between two layers with the object of ensuring that the two layers are joined together. Suitable materials for tie layers are well known in the art. A preferred tie layer material is ethylene acrylic acid (EEA). A preferred tie layer has a thickness of from 20 to 40 microns, more preferably about 30 microns.

Preferably the inner layer of polyethylene is from 30 to 90 microns thick, more preferably from 30 to 70 microns thick, more preferably from 35 to 60 and most preferably from 35 to 45 microns thick. Thus, the thickness of the laminate from the inner surface to the metal foil barrier layer is minimised. This is advantageous because it helps to reduce "scalping". Scalping is a term in the art for the loss of aromas and natural ingredients from a product into the polymeric material forming a container. In the case of hair dye, the scalping effect can take the form of indispensable formulation components present only in trace amounts being absorbed into the polyethylene. The use of a thinner layer and also the use of the more dense polyethylene layer help to reduce this undesirable loss of product components.

The inner layer of polyethylene has a mean density of 0.92 to 0.94 g/cm$^3$. This density is a selection from Medium Density Polyethylenes (MDPE). Preferably the mean density of the inner layer is from 0.930 to 0.938 g/cm$^3$. More preferably the mean density of the inner layer is from 0.932 to 0.936 g/cm$^3$, for instance equal to 0.932 g/cm$^3$. The inner layer may be formed either from a single MDPE material or from two or more layers having different densities that provide the mean density range. Thus, the inner layer may comprise HDPE and/or LDPE. This may be a blend together or in combination with MDPE. For example, a preferred inner layer is formed from a mixture of high density polyethylene (HDPE) and low density polyethylene (LDPE), for example, 75% LDPE (density 0.921) and 25% HDPE (density 0.965). Preferably the inner layer consists of polyethylene.

Laminates in the prior art rely on LDPE or very LDPE (VLDPE) to form the inner layer. Indeed, when forming a tube from the prior art laminate, the inner layer has to undergo two heat sealing operations. Firstly it is required to allow heat sealing of the "side seam" of the tube during manufacture, where the multi-layer web structure is rolled into a cylinder and then seamed together to form a continuous tube (that is subsequently cut to length). Secondly, after the tube is filled, it needs to be closed by heat sealing at the tube end. In this operation the inside of the tube is heated and pinched closed in jaws that apply pressure. The use of these lower density polyethylene materials favours these two operations.

This allows for simple heating sealing of the tube into its container configuration. However, the present inventors have discovered that such laminates lead to undesirable levels of scalping, leakage and oxygen ingress when used in the presence of such hard-to-hold products. The present inventors have found that if HDPE is used instead, then the seals formed when forming the container are more likely to fail and the advantages of the present invention are not seen.

Without wishing to be bound by theory, the present inventors have discovered that the inner layer described herein gives improved chemical resistance or reduced diffusion of product compared to conventional LDPE layers. As a consequence, there is a reduced risk of attack of the metal foil at the interface and reduced oxygen diffusion into the product. In addition, there is acceptable suck back and low cost.

"Suck back" is a phenomenon observed in tubes made with plastic containing materials. When the tube is squeezed the plastic undergoes an elastic deformation and when the tube is released the plastic material will attempt to return to its initial shape. This will create a pressure drop inside the tube and as a result the product in the orifice area of the tube is sucked back inside the tube, followed by air if the suck back is high enough to empty the orifice area. The suck back of air into the container can cause any product therein to oxidise and perish. The presence of a partial vacuum in the container can encourage oxygen ingress through the seals that form the container.

Preferably a tie layer adheres the inner layer to the metal foil barrier layer.

Unexpectedly, the use of a single inner (MDPE type) layer is preferred. The use of a single relatively thin tie layer is also preferred. Hence the amount of soft polymer (tie layer material) on the inner surface side is reduced. Logically it could have been expected that the soft material was an advantage because the "soft" layer flows out on forming a seal and serves to protect the exposed end of the metal foil from corrosion caused by the product. The cut edge is a known sensitive region. Surprisingly, the inner layer disclosed herein has been found to be sufficient for this purpose.

Preferably the laminated material further comprises an outer layer on the second surface side of the metal barrier layer, the outer layer providing a printable surface. The presence of a printable outer layer is essential to help brand and sell the product. A preferred printable layer comprises one or more layers of polyethylene adhered with a tie layer to the metal foil barrier layer. Preferably the outer layer comprises a coextruded film of LDPE and HPDE. Most preferably the outer layer is white, or at most lightly tinted, to increase the visibility of the subsequent printing. Preferably the outer layer consists of polyethylene.

With respect to the outer layer on the second surface side of the metal foil barrier layer, the composition and form of this layer is not critical to the present invention. However, the outer layer serves to protect the foil layer from physical abuse, to provide bulk or body to the film, and to support graphics, colour, and other forms of printing. In a preferred embodiment the outer layer is provided with a printed image and/or text.

The present inventors have discovered that it is desirable for the outer layer to have a thickness of from 100 to 180 microns, more preferably from 120 to 130 microns. The outer layer is preferably adhered to the metal foil barrier layer with a tie layer. The tie layer is preferably from 10 to 30 microns thick and most preferably about 20 microns thick.

In one embodiment, the outer layer may comprise a filler. Preferred fillers include calcium carbonate. The presence of a calcium carbonate filler serves to improve the deadfold characteristic without unduly increasing the cost of manufacture. The use of fillers, suitable amounts and techniques for including the fillers in polyethylene layers are well known in the art. Preferably the filler is added within the body of the outer layer, distanced from the outer surface of the laminated material.

An especially preferred laminated material for forming a flexible container to hold a hair dye, has a central aluminium foil barrier layer. The aluminium foil barrier layer has on a first side (product facing side) an inner layer adhered with a single tie layer (25 to 35 microns). The inner layer comprises polyethylene and has a thickness of from 35 to 45 µm and a mean density of 0.93 to 0.938 g/cm$^3$. The aluminium foil barrier layer has on a second side (consumer facing side) an outer layer comprising an outermost white LDPE/HDPE coextruded film of 85 to 95 microns on an LDPE 35 to 45 micron layer, adhered to the aluminium foil barrier layer with a single tie layer of 15 to 25 microns. The aluminium foil barrier layer is preferably from 10 to 15 microns. The laminated material has a total thickness of about 230 microns. More preferably the laminated material consists of the foregoing layers and no others.

In a preferred embodiment the inner layer is 75% Dowlex 3010™ LLDPE (linear LDPE), 25% Dow 8007™ HDPE; the tie layers are Dow Primacor 3330™ EEA; the outer layer is Equistar NA204-000™ LDPE.

According to a third aspect, the present invention provides a container for holding a hair dye, the container comprising the laminated material described herein. The laminated material is used to form the body of the container. Preferably the container is in a form resembling a toothpaste tube, albeit that the total volume of the tube is preferably less than for a standard toothpaste tube, i.e. volume sufficient for 25 to 100 ml of product.

According to a fourth aspect, the present invention provides a hair dye container comprising the container described herein and containing hair dye. Hair dyes are well known and the container should hold any suitable hair dye.

According to a fifth aspect, the present invention provides a toothpaste tube comprising the container described herein and containing dentifrice. The design of the present tube is particularly advantageous for holding air- and/or moisture-sensitive toothpaste compositions, or toothpaste formulations containing stannous fluoride. Stannous fluoride is well known to react with the aluminium foil at any non-protected edges and/or via diffusion through the inner layer. Tooth pastes (dentifrice) are well known and the container should hold any suitable tooth paste.

Preferably the foregoing containers are single use containers. However, it is known that even for single use packaging, certain consumers will attempt to spread the product over at least two applications, with hours or even days between each use. Advantageously, the reduction in suck back and the improvement in deadfold can help to allow consumers to make several applications without oxidation of the formula and loss of product performance between uses. That is, the compressed container remains largely compressed and, hence, air will not be significantly sucked back into the tube or container. Preferably, however, the container is a multi-use container. Such containers are useful for professional salon use or, for example, for use with toothpaste (dentifrice). The minimisation of suck back allows the product to be kept oxygen free and in optimal condition.

According to a sixth aspect, the present invention provides a method of forming a container, the method comprising folding the laminated material described herein into a desired configuration and heat sealing the overlapping edges to form the container. Techniques for forming such containers are well known in the art, for example EP0321172 discloses a technique for forming containers including toothpaste tubes.

According to a seventh aspect, the present invention provides the use of the laminated material as described herein to form a hair dye container or a toothpaste tube.

The present invention will now be described further with reference to the accompanying drawings, provided by way of example, in which:—

FIG. 1 shows a conventional squeezable tube suitable for storing a hair dye composition or toothpaste. The body of the tube is formed from an aluminium barrier laminate. One end is provided with a shoulder and a lid, the end has been crimped closed. The tube depicted has suffered from de-lamination at the fold (longitudinal seal) and staining is evident (bottom right of the picture).

Figure 4:
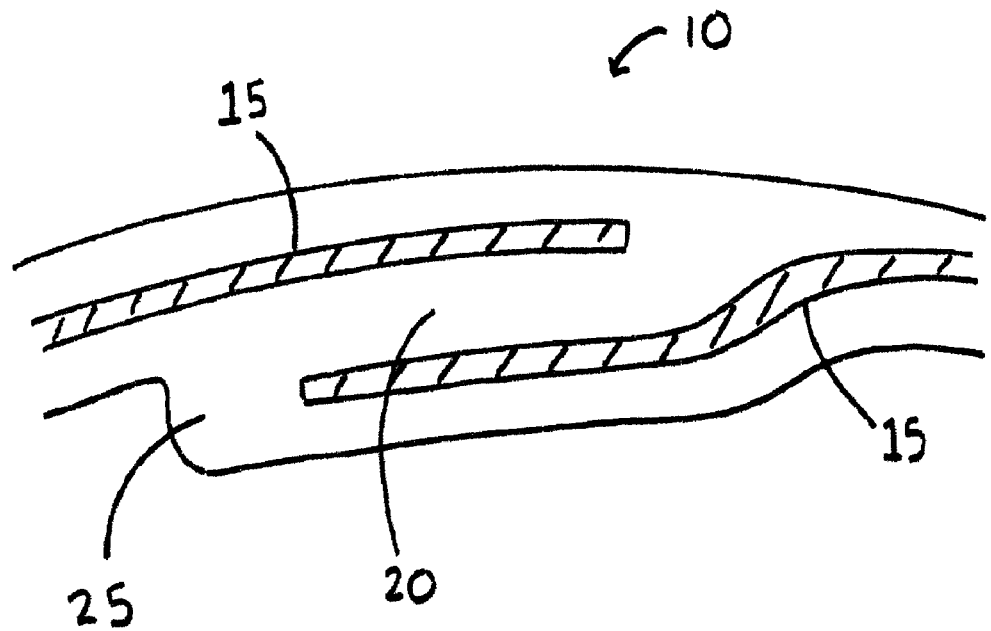

FIG. 4 shows a sketch of the overlapping join formed when a tube (10) is made from a laminate web. The aluminium ends (15) of the aluminium foil are overlapped to form an overlapping region (20). Some excess material is squeezed out of the overlapping region 20 to form the polymer "flow out" region (25). Advantageously, this region protects the innermost aluminium end from corrosion by contact with the tube contents.

Figure 1:
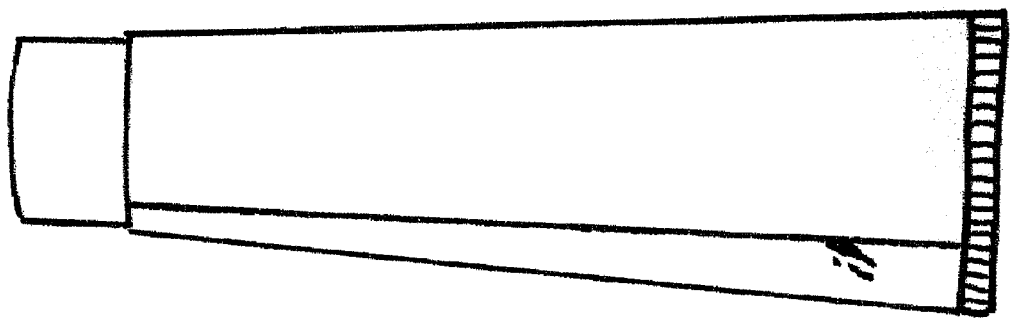
Figure 2:
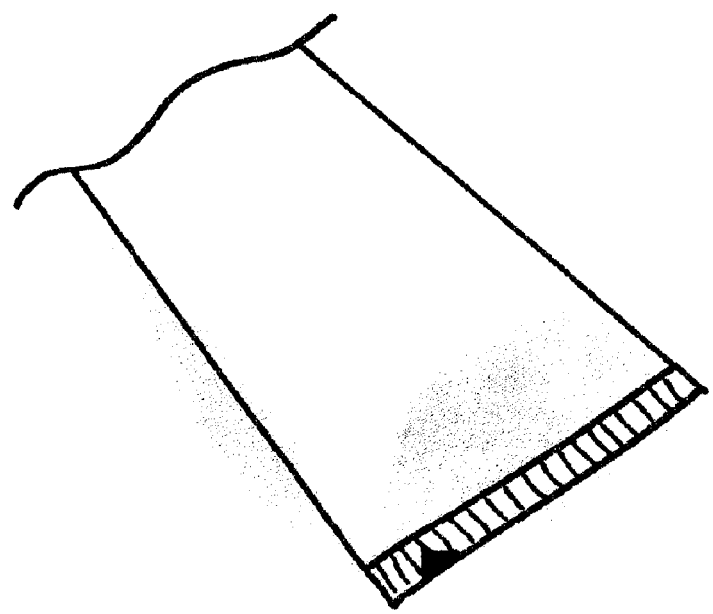
FIG. 2 shows the end of a conventional squeezable tube suitable for storing a hair dye composition or toothpaste. The tube depicted has suffered from de-lamination at the end crimp and staining is evident (bottom left of the picture).
Figure 3:
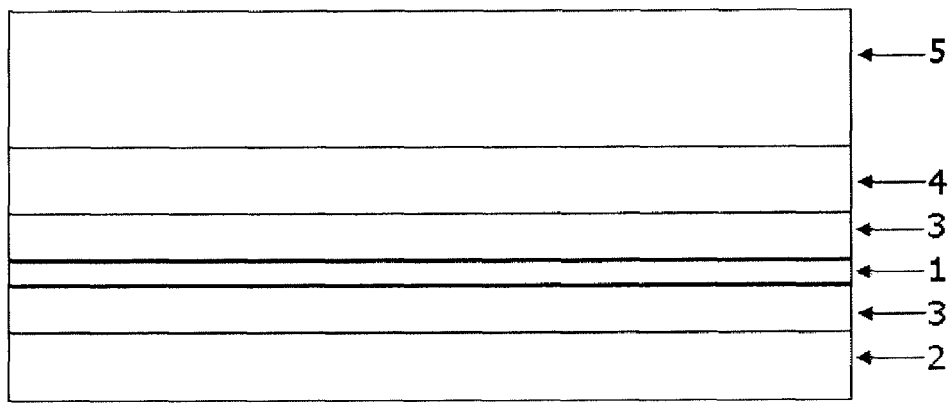
FIG. 3 shows a schematic diagram of the layers that form the laminate of the present invention.

A preferred laminate will now be described with reference to FIG. 3. The aluminium foil (1) is provided with an MDPE layer (2) on a first side to form the inner side when forming a tube. The MDPE layer (2) is attached with a tie layer (3). On the outer side a co-extruded LDPE/HDPE film (5) is adhered to the aluminium foil (1) with an LDPE layer (4) and a tie layer (3). The total layer thickness is 229 microns, comprising: 13 microns of aluminium foil (1), 41 microns of MDPE layer (2) adhered with a 28 micron tie layer (3); 89 microns of co-extruded LDPE/HDPE film (5) adhered with 38 microns of LDPE layer (4) and 20 microns of tie layer (3).

Preferably the MDPE layer (2) is 75% Dowlex 3010™ LLDPE (linear LDPE), 25% Dow 8007™ HDPE; the tie layers (3) are Dow Primacor 3330™ EEA; the LDPE layer (4) is Equistar NA204-000™ LDPE.

The effect of the present invention is demonstrated by the following non-limiting examples.

Tubes of the present disclosure and comparative conventional laminated material tubes were made and tested by direct contact with the aggressive hair dye products (commercial products purchased from the shop shelves or various brands and compositions). This involved making tubes with the various webs (laminated materials) under test, filling the tubes with the hair dye product, sealing them and storing for up to 3 months at 45° C. At various time periods the tubes were extracted, cut open and emptied. The inside of the tube webs were evaluated for corrosion by visual observation; i.e. adherence of the side seam, copper sulphate analysis to reveal bare aluminium, end seam integrity.

It was found that the conventional tube made with an LDPE inner layer failed through oxygen ingress into the tube either at the side seam or in the end seam of the tube. These are two regions where there is little or no overlap of the aluminium foil of the web and constitute two "weak zones" where the protection is only provided by the polymer. LDPE appears to allow too much oxygen to migrate into the tube causing a catastrophic oxidation of the hair dye formulation and a subsequent change in colour of the formula.

In contrast, the tubes of the present disclosure reinforce these weak zones and allowed a lower oxygen diffusion rate. Hence, improved protection of the formula was observed. The switch to the specific density MDPE appears to provide improved protection, enough at least to pass the product compatibility testing procedures.

Suck back of the inventive tube and the comparative tube was also tested. This was performed with a water column apparatus. The tubes were half emptied, connected to a water column while still squeezed and then tube released. The conventional web demonstrated a suck back of 60 mm of water (tube diameter of 0.7 mm), the inventive web, demonstrated a suck back reduced by 50%, i.e. 30 mm.

The material costs were also compared and it was found that reducing the web thickness reduced from 280 (comparative) to 230 µm (inventive) resulted in an 18% reduction in material usage.

Tubes were also produced with the web (laminated material) of the present invention except that the inner layer was LDPE instead of MPDE. These were tested in the same manner and showed failure due to oxidation of the hair dye formula in the two weak zones, i.e. the end seal and the side seam areas. This is observed by discolouration of the hair dye formula and migration of the hair dye product through these regions towards the outside, leading to visible discolouration of the tube. In general this discolouration seen on the outside of the tube is predominantly a phenomenon seen in the side seam rather than the end seam.

The laminate of the present invention is chemically compatible with hair dye (aggressive, product pH approx 12, oxidizing), eliminates oxygen ingress into the container that can result in oxidation of the formulation and a significant colour change, has a minimal thickness to reduce cost for what is a very cost sensitive market. Furthermore, the present inventors have discovered that the laminate greatly reduces "suck back" into the tube that could otherwise cause degradation of the hair dye formula by oxidation.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A laminated material for forming a flexible container for holding a hair dye or the like, the laminated material having a first surface which, in use, forms the internal surface of the container, and a second surface which, in use, forms the external surface of the container, the laminated material comprising an inner layer, an outer layer and an intermediate metal foil barrier layer, wherein the inner layer is on the first surface side of the metal foil barrier layer and directly adhered to the intermediate metal foil barrier layer with a first tie layer, and wherein the outer layer is on the second surface side of the metal foil barrier layer and directly adhered to the intermediate metal foil barrier layer with a second tie layer, wherein the laminated material has a total thickness of at most 240 µm, and wherein the inner layer comprises polyethylene, and has a mean density of 0.92 to 0.94 g/cm$^3$ and wherein the outer layer comprises one or more layers of polyethylene.

2. A laminated material according to claim 1, wherein the inner layer has a thickness of from 30 to 90 µm.

3. A laminated material according to claim 2, wherein the inner layer has a thickness of from 35 to 40 µm.

4. A laminated material according to claim 1, wherein the mean density of the inner layer is from 0.930 to 0.938 g/cm$^3$.

5. A laminated material according to claim 1, wherein the laminated material has a total thickness of from 225 to 235 µm.

6. A laminated material according to claim 1, wherein a tie layer adheres the inner layer to the metal foil barrier layer.

7. A laminated material according to claim 1, wherein the inner layer comprises HDPE and/or LDPE.

8. A laminated material according to claim 1, wherein the outer layer provides a printable surface.

9. A container for holding a hair dye, the container comprising the laminated material according to claim 1.

10. A hair dye container comprising the container according to claim 9 and containing hair dye.

11. A toothpaste container comprising the container according to claim 9 and containing dentifrice.

12. A container according to claim 9, wherein the container is a multi-use container.

13. A container according to claim 9, wherein the container is a single-use container.

14. A method of forming a container, the method comprising folding the laminated material according to claim 1 into a desired configuration and heat sealing the overlapping edges to form the container.

15. A laminated material according to claim 1 wherein the intermediate metal foil barrier layer is aluminum, the inner layer is MDPE, and the outer layer is a coextruded LDPE/HDPE film adhered to LDPE layer.

16. A laminated material according to claim 1 wherein the intermediate metal foil barrier layer is aluminum, the inner layer is a LLDPE/HDPE blend, and the outer layer is a coextruded LDPE/HDPE film adhered to LDPE layer.

17. A laminated material according to claim 1 wherein the intermediate metal foil barrier layer is 5 to 30 μm, the inner layer is 30 to 90 μm, and the outer layer is 100 to 180 μm.

18. A laminated material according to claim 17 wherein the first tie layer is 20 to 40 μm and the second tie layer is 10 to 30 μm.

19. A laminated material according to claim 1 wherein the inner layer is a LLDPE/HDPE blend, the first tie layer is ethylene acrylic acid, the second tie layer is ethylene acrylic acid, and the outer layer is a coextruded LDPE/HDPE film adhered to LDPE layer, wherein the LDPE layer is attached to the second tie layer; wherein the inner layer is 41 μm, the first tie layer is 28 μm, the intermediate metal foil barrier layer is 13 μm, the second tie layer is 20 μm, the LDPE layer is 38 μm, and the LDPE/HDPE film is 89 μm.

* * * * *